Ross

United States Patent [19]

[11] 4,052,721

[45] Oct. 4, 1977

[54] MULTI-TARGET TRACKER FOR TRACKING NEAR CO-RANGE TARGETS

[75] Inventor: Walter Lee Ross, Simi Valley, Calif.

[73] Assignee: RCA Corporation, New York, N.Y.

[21] Appl. No.: 643,478

[22] Filed: Dec. 22, 1975

[30] Foreign Application Priority Data

Apr. 14, 1975 United Kingdom ............... 15218/75

[51] Int. Cl.² .............................................. G01S 9/56
[52] U.S. Cl. .............................................. 343/6.5 LC
[58] Field of Search .................................. 343/6.5 LC

[56] References Cited

U.S. PATENT DOCUMENTS

| 3,696,415 | 10/1972 | Ballantyne | 343/6.5 LC |
|---|---|---|---|
| 3,803,608 | 4/1974 | Breckman | 343/6.5 LC |
| 3,893,112 | 7/1975 | Miller | 343/6.5 LC |
| 3,947,845 | 3/1976 | Lyon | 343/6.5 LC |

Primary Examiner—Malcolm F. Hubler
Attorney, Agent, or Firm—Edward J. Norton; H. Christoffersen; Joseph D. Lazar

[57] ABSTRACT

A digital tracker in a cooperative collision avoidance system capable of generating track gates and determining critical values of tau (time to collision) for at least 16 targets and to determine the presence of two targets of substantially similar ranges and to track two such co-range targets.

5 Claims, 3 Drawing Figures

MULTI-TARGET TRACKER FOR TRACKING NEAR CO-RANGE TARGETS

CROSS REFERENCE TO RELATED APPLICATIONS

Of interest are the following copending patent applications: Ser. No. 569,995, filed Apr. 21, 1975, entitled "Full Range Correlator for Use in a Collision Avoidance System," based on the invention of J. E. Miller; Ser. No. 643,481 filed on Dec. 22, 1975 entitled "Mutli-Target Tracker," based on the invention of J. E. Miller; and Ser. No. 643,479 filed on Dec. 22, 1975 entitled "Multiple Target Data Receiver for a Collision Avoidance System," based on the invention of W. L. Ross, all applications assigned to the same assignee as the assignee of the present application.

BACKGROUND OF THE INVENTION

1. Field of the Invention

This invention relates to a digital tracker of aircraft to provide range and critical values of time to collision in a collision avoidance system for at least 16 targets substantially simultaneously including at least one pair of co-range targets.

2. Description of the Prior Art

Collision avoidance systems have been proposed as means of preventing collisions by vehicles both of the maritime vessel type and of the airborne type. Cooperative systems of the asynchronous type include interrogator-transponder techniques in which interrogation signals or probes are transmitted from one vehicle on a random basis. Vehicles in the vicinity receiving such probes respond with signals of various indicia to provide to the interrogation vessel information relating to both range and information identifying the vessel and its position. In airborne systems such information may include the relative or actual altitude of the aircraft.

An existing collision avoidance system known by the acronym SECANT (Separation Control of Aircraft by NonSynchronous Techniques) employs probes identified by any one of a plurality of frequencies and replies using different frequencies of the same band but arranged into a predetermined correspondence to a particular probe frequency. Special correlation techniques aboard any vehicle separate the true reply to its probes from other signals which may be replies to probes generally identified as "fruit" from remote vessels. Such a system is described in U.S. Pat. Nos. 3,755,811 issued Aug. 28, 1973, and 3,803,609, issued Apr. 9, 1974, based on the inventions of Jack Breckman as well as U.S. Pat. No. 3,803,604 issued Apr. 9, 1974, to Bernard Case.

In such collision avoidance systems, the ability to track more than one target at a time depends upon expanding the circuit components of the system to accommodate each additional target to be tracked. Such an arrangement for multiple target tracking is not only complex but costly due to the additional components required.

In addition, the ability to track two targets that are converging to a point where their response signals would appear to the system to be a single target is a problem that can generate spurious bits which interfere with the proper operation of the tracker.

SUMMARY OF THE INVENTION

According to the present invention, a digital tracker for a vehicular collision avoidance system is provided with means for tracking at least 16 targets including means for tracking two of such targets that are substantially co-range and to determine critical values of the time to collision for each of such targets.

BRIEF DESCRIPTION OF A PREFERRED EMBODIMENT

A typical collision avoidance system preferably of the SECANT type is described in the above-identified Breckman patents. A digital tracker useful in such a SECANT system is described in the above-identified digital tracker patent of Bernard Case. Such a system provides for a transmission of a probe from an interrogating vehicle such as an aircraft in the environment of other aircraft similarly equipped with its own transmitter and a receiver, the combination being also known as a transponder. Upon the receipt of each probe signal, a vehicle in the vicinity sends back a reply signal to the environment. Such reply signals are received by other aircraft as well as the original or interrogating (probe transmitting) aircraft. The signals received by the interrogating aircraft are correlated in accordance with the principles discussed in the above patents to identify the identifying target aircraft that should be tracked for further data concerning such aircraft. A threatening aircraft is identified when it has a ratio of range to closing range rate approaching a critical value of time to potential collision (known as tau) with the interrogating aircraft.

The track cycle for tracking such identified aircraft is suitably divided into three periods for suitable data accumulation, more particularly, the data concerning the range and the range rate (the rate of closure). Circuitry for achieving such data based on a mathematical algorithm is described in U.S. Pat. No. 3,893,112, issued July 12, 1975, entitled "Computer for Threshold of Tau." The implementation of the computer in a tracker of the type described above is achieved in a serial relation whereby one target at a time is tracked and the data needed to determine the range rate is determined in such serial fashion. As will be described herein, the multi-target tracker of the present invention implements the mathematical algorithm described in U.S. Pat. No. 3,893,112 but in parallel logic form to thereby provide for the determination of the range rate for many targets substantially simultaneously.

Figure 1A:
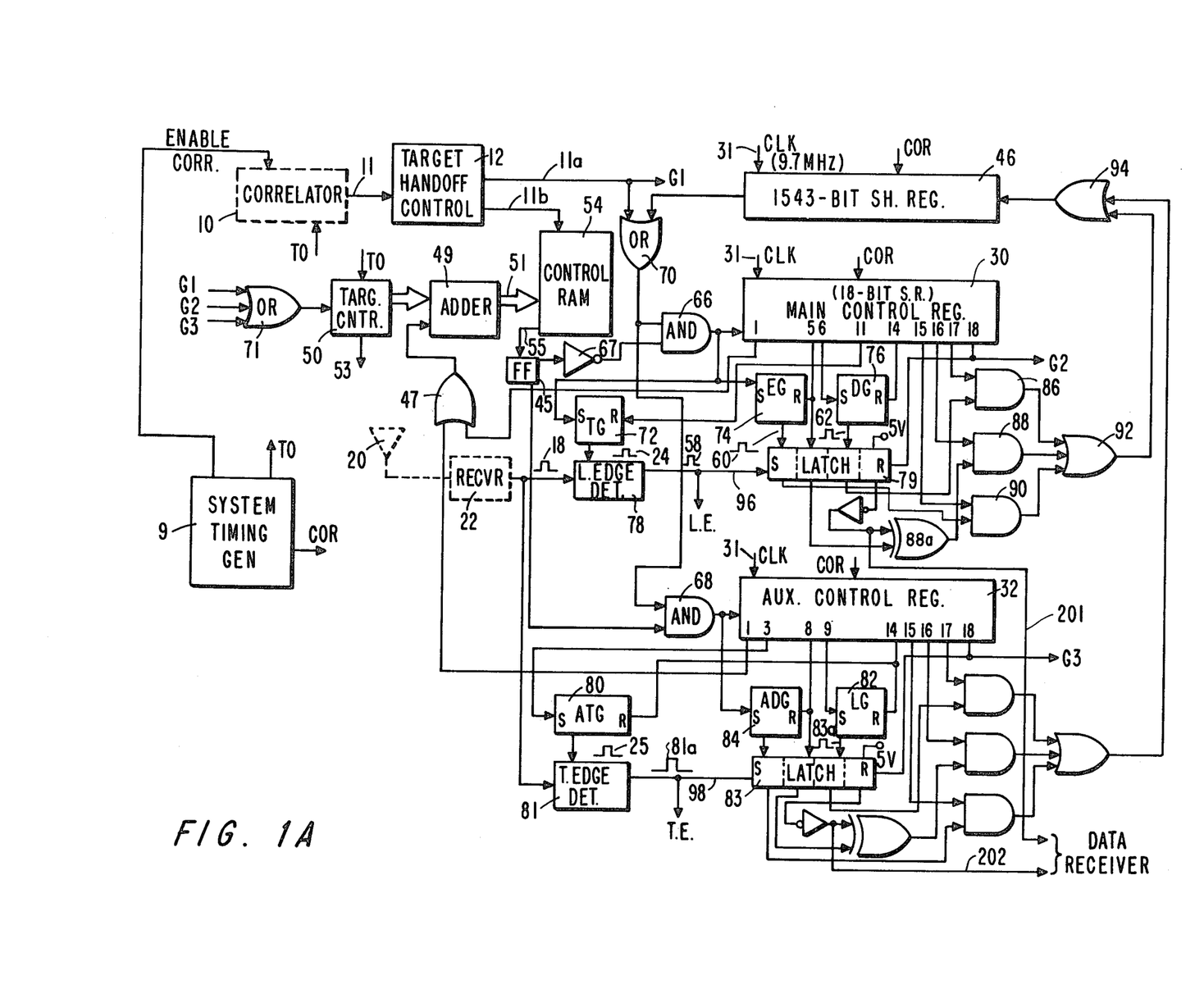
FIGS. 1A and 1B comprise together a simplified block diagram of a digital tracker embodying the present invention.
Figure 1B:
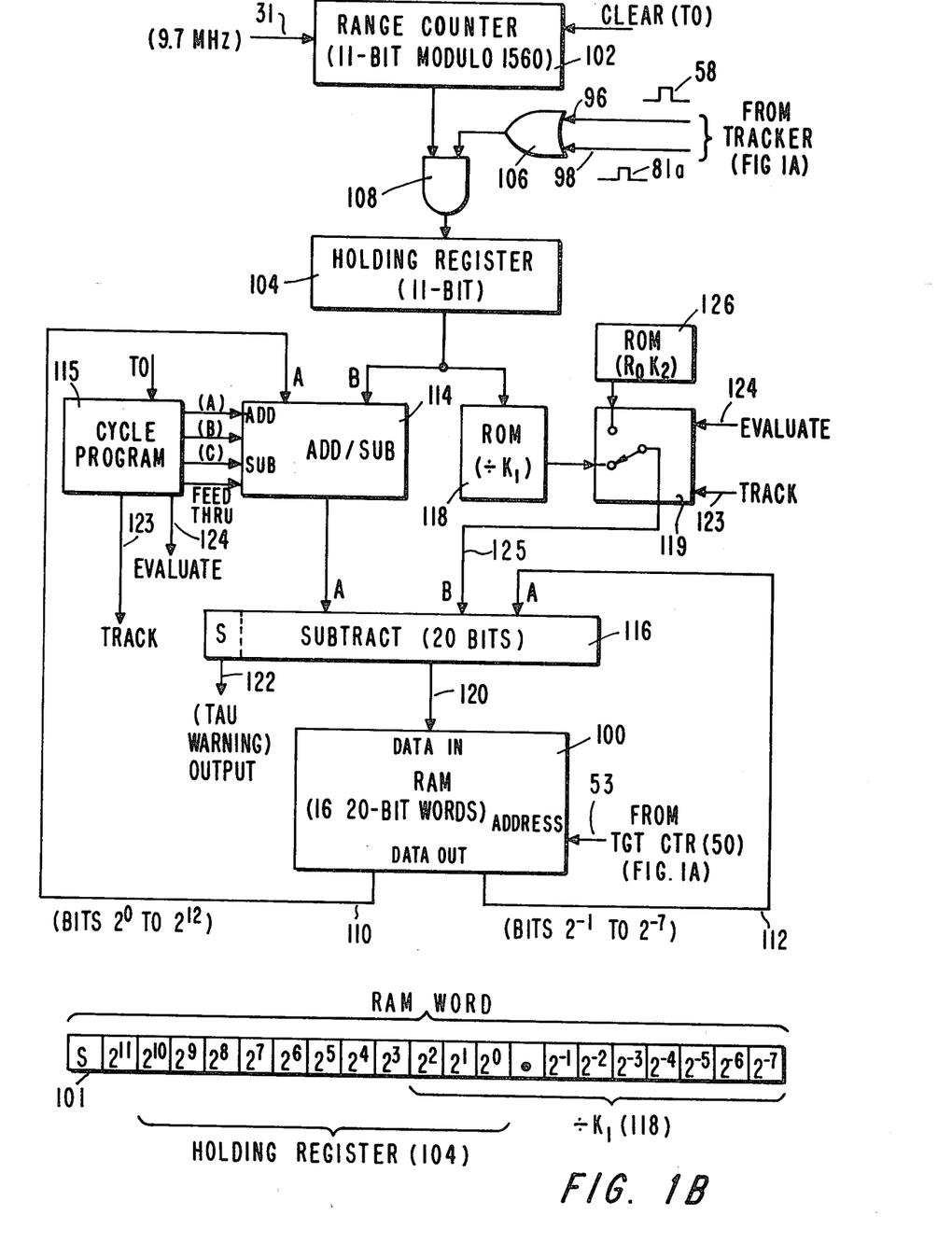

Reference is made to the block diagram of FIGS. 1A and 1B of a multi-target tracker in accordance with the present invention. It is assumed that the system is provided with a local timing source of clock pulses identified as interrogation pulses $T_0$ which are generated approximately once every millisecond, each such pulse being the reference for the timing system of the interrogating aircraft. It is further assumed that suitable equipment is provided for transmitting such interrogation pulses to the environment as probes and that such probes elicit reply signals from vehicles such as aircraft in the environment. Such reply signals are returned and suitably processed and identified as reply signals or reply videos.

In a typical system in which the present tracker is utilized, the timing intervals and program sequence of correlation, acquisition, tracking, and evaluating is shown in Table I.

TABLE I

| PROGRAM STEP | FUNCTION | PROBE INTERVALS MILLISECONDS |
|---|---|---|
| 1 | correlate ("COR") | 25 |
| 2 | correlator handoff | 1 |
| 3 | acquisition | 12 |
| 4 | A track interval | 57 |
| 5 | B1 track interval | 57 |
| 6 | B2 track interval | 57 |
| 7 | B3 track interval | 57 |
| 8 | B4 track interval | 57 |
| 9 | C track interval | 57 |
| 10 | evaluate | 2 |
| 11 | (Repeat Steps 1-10) | |

During program step 1, targets are detected and stored in an appropriate one of a group of relatively low resolution (500 feet) range bins of the correlator. The correlator range bins may take the form of a shift register. During program step 2, range bins information from the correlator is shifted out and handed-off to a relatively high resolution (50 feet) target tracker. As is known, a target tracker has the capability of comparing the predicted range to a detected target (particular range bin in which the target is stored) with the measured range thereto (as indicated by the time of receipt of a reply pulse therefrom) to derive an error signal. This error signal is then used to correct appropriately the predicted range.

During program step 3, the target tracker is operated in an acquisition mode which increases the range resolution from the relatively low value thereof, as received from the correlator, to the relatively high value of range resolution capability of the tracker. In the remaining program steps, the tracker tracks the range of the target with high resolution to measure thereby both the target range and the range rate of closure thereof so that the time, tau, to collision can be computed.

The present invention is directed to an improvement to the multi-target tracker forming the subject matter of the aforesaid copending Miller patent application Ser. No. 643,481 which is capable of serially tracking in succession each of a group of separate targets detected by the correlator during a one millisecond probe interval. This multi-target tracker employs the leading edge of each corresponding reply pulse received during a probe interval to derive an error signal for each successive target in the group. Such a serially-operated multi-target tracker can accommodate a group of at least 16 separate targets.

So long as the range interval between any two successive detected targets is at least a given minimum, no problem exists in serially tracking all of the multiple targets. However, when the range interval between any two successive targets is very small (i.e., the two successive are nearly co-range), there may be insufficient time to serially track both targets one at a time. The present invention discloses a refinement to such multi-target tracker which solves this problem.

Specifically, according to the present invention, only those detected targets, if any, which follow a preceding detected target by less than a minimum range interval, which indicates nearly co-range targets, are selectively directed to an auxiliary portion of a multi-target tracker. All remaining targets are directed to the main portion of the multi-target tracker. This main portion of the multi-target tracker, as is normal, employs the leading edge of corresponding reply signals to derive an error signal for each of its series of targets. However, in accordance with the present invention, the auxiliary portion of the tracker employs the trailing edge, rather than the leading edge, of corresponding reply pulses to derive an error signal for each of its targets. Thus, an additional time interval corresponding to the duration of a reply pulses, (i.e., one microsecond corresponding to about a 500 feet range interval) is added which permits serial tracking of two nearly co-range detected targets to be accomplished.

More particularly, the system is provided with a system timing generator 9 shown in FIG. 1A to control each of the components of the collision avoidance system, of which the present tracker is a component. It should be understood that in the system described, it is assumed that the correlator is not in use until the next correlator interval.

A correlator 10 such as described in U.S. Pat. No. 3,887,916 issued June 3, 1975, entitled "Correlator and Control System for Vehicular Collision Avoidance," provides range bins information, which may be stored in a shift register, over path 11 to a target hand-off control 12. The local timing source 9 also provides the basic probe signal $T_0$ which is passed to a target counter 50 for resetting it to zero at the start of each probe period. The local timing source also provides a signal used to clear shift register 30, 32, and 46, as well as control RAM 54 during each correlation cycle.

Target hand-off control 12 includes pulsed means for serially shifting out the range bins information from correlator 10 and forwarding it as a target hand-off signal to output 11a, as is conventional. The target hand-off signal is applied over path 11a to be applied to a target counter via OR gate 70 on control lead G1. Target hand-off control 12 includes a detector for monitoring the correlator range bins information, and in addition, provides a control signal over path 11b to RAM 54 which selectively designates to the tracker at the time of hand-off either a leading edge or trailing edge track mode for each of the target signals being tracked. More specifically, the detector of control 12 is designed to detect the occurrence of two separate targets within a very short range interval (e.g. manifesting a target separation of in the order of only 500 feet). The second target signal must be delayed at least one shift register range bin to be sure that the targets are two separate and distinct targets. Such a second target will be understood to indicate a substantially "co-range" target noting again that the range of such a co-range target is not precisely identical. The detector is a suitable discriminator circuit, not shown, within control 12, formed suitably of flip-flop and comparator logic, which selectively generates a binary logic signal over path 11b (such as a high voltage) to write a bit into RAM 54 to control the co-range tracking function. The address for RAM 54 is provided by the adder 49.

In order to track two such co-range targets, tap 1 of each of the two shift registers 30 and 32 is respectively coupled through an OR gate 47 to the least significant augend position of four-bit adder 49 each time a target bit appears at tap 1. The addend of adder 49 is coupled to the output of target counter 50 and is thus incremented as counter 50 is incremented. If no co-tracking mode is indicated, that is, in the usual tracking mode, each target bit will be steered through shift register 30. However, for a co-tracking mode, the closely following target bit must be steered into shift register 32. This is achieved by a flip-flop controlling the steering function. Flip-flop 45 is set in accordance with the leading edge (usual mode) and trailing edge (co-range mode) bit stored in RAM 54 as a result of the timing control 12 signal at the time each target was handed off. The target address 51 to RAM 54 is incremented by one during the co-range test to set up flip-flop 45 according to the track mode required for the next target. The RAM address returns to synchronous count with the target counter 50 as soon as the target bit moves out of tap 1 of register 30 or 32. Flip-flop 45 thus serves to remember the tracking mode for a following target while the current target is being processed.

When a co-range tracking mode is indicated, control RAM 54 provides a signal over path 55 to operate a D-type flip-flop 45 into a state to inhibit AND gate 66 via inverter 67 and enable AND gate 68 for starting control register 32 with the presence of a target signal on path 11a. At the completion of correlator hand off, the tracker shift registers (30, and 46) will contain a bit for each target handed off, and the control RAM 54 will contain a "one" for each of the targets designated as co-range. The position of each target bit in the tracker shift register is proportional to the range at which the correlator found the target. Following the correlator hand-off signal, the acquisition interval begins. The purpose of acquisition is to servo the position of the target bits in the tracker shift registers onto the targets video before tracking measurements are taken. The correlator bins are typically 500 feet wide while the tracker operates with 50 foot range increments. The range as handed off by the correlator will usually differ from the true range. Therefore, the acquisition period allows the tracker to lock onto the target before true tracking begins.

As each target bit enters the control register, the tracker is arranged to provide a track gate signal 24 (see FIG. 2) to pass to the tracker a video reply signal 18 corresponding to the target. Such video reply signals are received over antenna 20 and passed through a receiver 22. The video signal 18 is suitably thresholded to a value that discriminates signals that are remote and thus of no consequence and passes those of consequence to the tracker. Such a receiver is described in U.S. Pat. No. 3,848,191 issued Nov. 12, 1974, to L. H. Anderson. During normal operation without a co-range target being indicated, each bit corresponding to a target is entered into a suitable shift register 30 having 18 stages to function as an 18-bit shift register 30 via OR gate 70 and AND gate 66 normally enabled by control RAM 54 and FF45. Each target bit is passed by OR gate 70 through AND gate 66 to the input of register 30. Shift register 30 is clocked 1560 times by a nominally 10 MHz (but preferably 9.71252 MHz to provide certain system design parameters) clock 31 following each correlation probe signal $T_0$. The shift register 30 in combination with shift register 46 or auxiliary control register 32 in combination with shift register 46 provides a 1560 stage shift register. Since each bin or stage of the shift registers is equal to 50 foot, a range of 13 miles is represented by the passage of a bit through the parallel loop combination of shift registers.

The total length of shift registers 30 and 46, or 32 and 46 is 1560 bits when exit tap 16 is used to close the loop. When exit tap 15 is selected, the shift register is 1559 bits long and when exit tap 17 is selected, the shift register is 1561 bits long. It is by selection of different exit taps that the target bit can be moved relative to the video reply or relative to the probe $T_0$, as desired.

During tracking, as each $T_0$ probe is transmitted, the shift registers 30, 32, and 46 are provided with 1560 clock pulses. Each target bit is thus applied to shift register 30 sequentially. If the target is identified as corange thus requiring trailing edge mode tracking, control RAM 54 inhibits AND gate 66 via FF 45 and inverter 67 and allows such target bits to be passed into auxiliary control (shift) register 32 via AND gate 68 enabled by FF 45. The respective and sequential target bits are thus steered into the proper control register under control of RAM 54. The leading edge targets are applied to main control register 30 and the trailing edge targets are thus applied to the auxiliary control register 32. Shift registers 30 and 46 form a servo tracking loop for each of 16 possible targets, each such target being represented by a bit advanced through the registers. The passage of each target bit through the control registers provides all of the control signals that are used to perform the usual tracking, tau calculation, and the data gathering functions described in the aforesaid application Ser. No. 643,479.

The tracking function for a leading edge target, that is, a target that represents a non corange situation, is as follows. As the target bit enters the control register 30, a track gate 72 and an early gate 74 are set simultaneously generating track gate signal 24 and early gate signal 60 (see FIG. 2). Track gate 72 enables a leading edge detector 78 by track gate signal 24 which in turn generates a signal 58 representing the leading edge of video signal 18. Signal 58 sets latch 79. When the target bit reaches stage 5 of register 30, the early gate 74 is reset thereby changing early gate signal 60 to zero. When the bit reaches stage 6, a data gate DG 76 is set, generating data gate signal 62 while at stage 11 track gate 72 is reset, signal 24 going thus to zero; at stage 14 data gate 76 is reset reducing signal 62 to zero. Each of the gates 72, 74, and 76 as well as the corresponding auxiliary gates 80, 82, and 84, to be described, are suitable flip-flops.

The video reply 18 corresponding to the signal that the correlator processed to identify a target and which is further processed as a target bit into the shift register 30, will be received during the time-track gate 72 is set and leading edge detector 78 will strobe a four position latch 79 setting thereby one of the bits of the latch. The particular one of the four latch positions that will be set depends on which stage of the control register 30 is occupied by the target bit when the video signal 18 is received by the latch 79. Latch 79 enables one of three AND gates 86, 88 (via exclusive OR gate 88a) and 90 which in turn pass the target bit from control register 30 to the shift register 46 via OR gates 92 and 94. If latch 79 was set by early gate 74, the target bit is late relative to the video signal 18, and the target bit must be taken from stage 15 of the register to be passed via gate 90 to shift register 46. By selecting exit tap 15 for this particular target bit in effect a 1559 bit register is clocked 1560 times. When the bit has completed the loop, it shows up a bit time earlier since it, in effect, received an extra shift pulse. This operation will thus advance by one stage or 50 feet the next appearance of this particular target bit. If the second position of latch 79 is set by stage 5 of control register 30, the track gate signal 24 will be centered on the desired leading edge of the video reply signal 18 and the target bit will be taken from stage 16 of register 30 via gate 88. Accordingly, the next appearance of this particular control bit will be unchanged in time relative to the video reply 18. If latch 79 is set by data gate 76, the target bit thus early relative to the video signal 18 and is taken from stage 17 of register 30. The next appearance of this control bit in the loop in this case will be 100 nanoseconds or 50 feet later relative to the video signal 18.

It should be understood that it is possible for the video return signal 18 to be missing following one probe of the tracking cycle for one reason or another. In such a case, latch 79 will not be set. Accordingly, the fourth stage of latch 79 provides in this case that the target bit being circulated through register 30 at this time is taken from stage 16 and passed through AND gate 88 into shift register 46. In effect, thus, the position of that particular target bit for that probe is left unchanged. Whatever the action of the tracker when the target bit reaches stage 18 of register 30, latch 79 is reset and the target counter 50 is advanced via control lead G2 through OR gate 71.

The action of the auxiliary control register 32 and its associated logic components is substantially similar to that of register 30 except that the respective gates 80, 82, and 84 derive their set signals from register 32 stages 3, 8, and 9 to provide the offset represented by the width of the video reply. It should be noted that during the co-range tracking mode, each video signal 18 that is received will be steered into either latch 79 or latch 83 depending on which video detector is enabled by a track gate. In a co-range mode, the first signal will be thus steered into latch 79 while the target bit is circulated in registers 30 and 46; the second closely following trailing edge detected signal will be steered into latch 83 while the second target bit will be circulated in registers 32 and 46. As each target bit leaves register 46, it will be steered into either shift register 30 or 32 via OR gate 70 corresponding to whether it is a trailing or leading edge bit. RAM 54 will control FF 45 to effect this steering function as follows. Control RAM 54 is addressed by the target counter. Thus, if target No. 1 is leading edge and target No. 2 is trailing edge, RAM location No. 1 will contain a "zero" and RAM location No. 2 will contain a "one." Target No. 3 will be leading edge and RAM location No. 3 will contain a "zero," etc.

Figure 2:
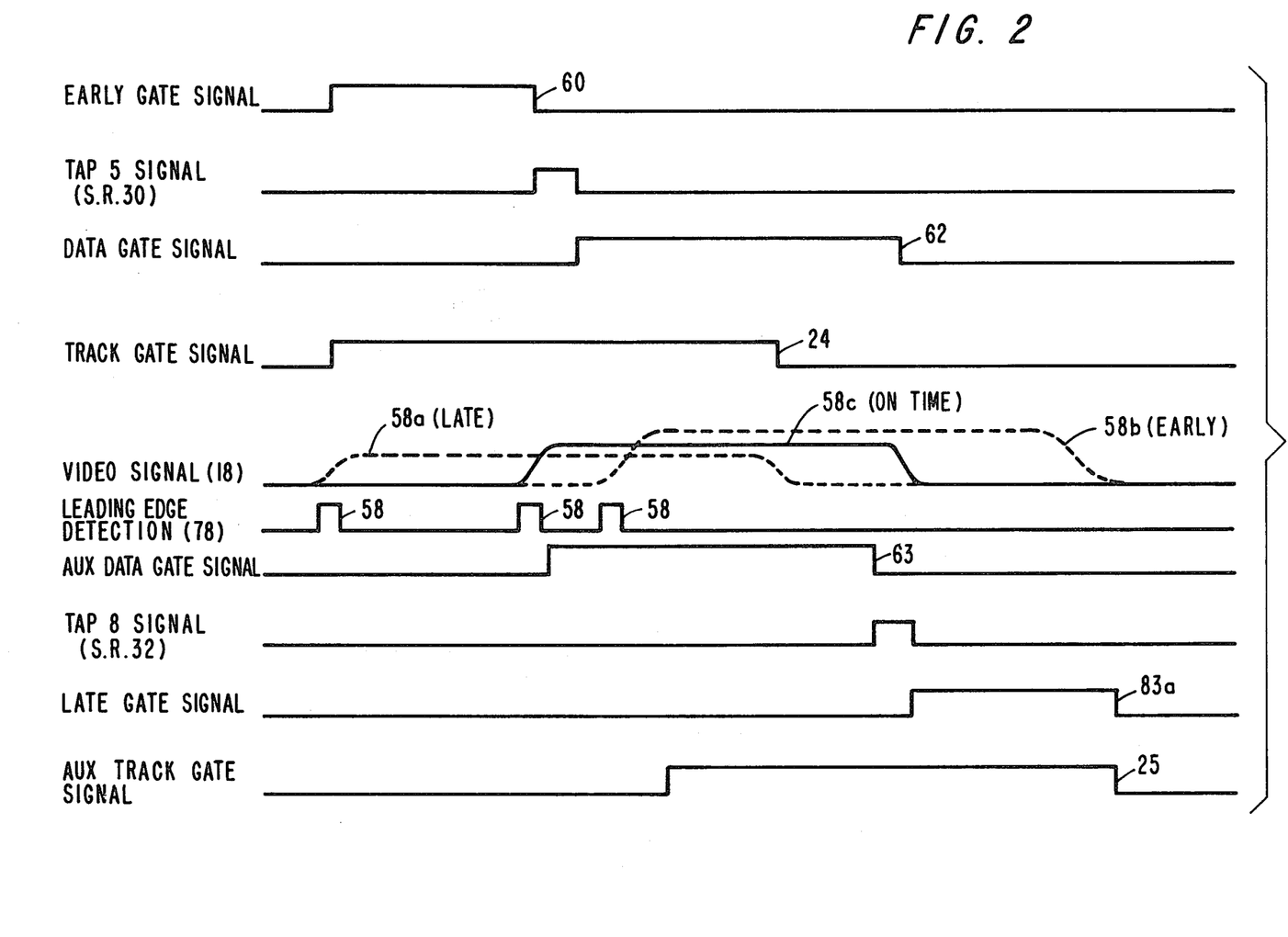
FIG. 2 is a diagram of waveforms in timing relation illustrating the operation of the system embodied in FIGS. 1A and 1B.

Reference is made to the timing diagram, FIG. 2 illustrating the various gate functions relative to the video signal to illustrate the on target, early gate, and late gate conditions. Thus, if video signal 18 is received while early gate signal 60 is on, the output signal of leading edge detector 78 is 58a, which will set latch 79 late relative to the target bit position in register 30. If video 18 is received while data gate signal 62 is on, the leading edge detector signal is 58b, setting latch 79 early relative to the target bit in register 30. If video 18 is received while the track gate signal 24 is centered on the leading edge of video reply 18, then the output signal is 58c. A similar tracking function occurs when the tracker goes into the co-range tracking mode. Thus, auxiliary track gate signal 25 will center on the trailing edge of video 18. The data auxiliary gate signal 63 will cause the target bit to be advanced while the late gate will cause the target bit retarded until the tracking bit is centered. The action of the tracker is repeated for every target, following each probe during the track interval.

The waveforms are shown with widths that are relatively proportional to each other. For a 10 MHz clock, the taps of registers 30 and 32 are approximately 100 nanoseconds establishing a range of about 50 feet between taps. Thus, the signal for taps 5 and 8 are 100 nanoseconds, the early and late gates are 500 nanoseconds, data gate 800 nanoseconds, track gates 1100 nanoseconds, and the video signal 1400 nanoseconds.

The multi-tau detector portion is shown in FIG. 1B. While a target is being tracked by the tracker portion of the system as just described, the computer for the tau value is performing the calculation to determine whether the target in question is of so serious a thread as to require a warning to the pilot that a collision threat has ben identified. Essentially, the computer operates on the input data from the tracker and determines when a target has a tau that is less than a critical preset value. The computer may, if desired, provide a tau that represents the actual time to collision.

The computer of FIG. 1B performs a running calculation of tau during the track interval following a selected number of probes on each of up to sixteen targets. The basic equation of the calculation is derived from the relationship:

$$R = R_0 + R\tau \tag{1}$$

where R equals range, $R_0$ is the range offset, $\dot{R}$ is the range rate, and tau is the time to alarm. In the implementation being described, the range offset is 0.25 nautical miles, while the tau to alarm is 25 seconds.

The track format of one form of a tracker provides for 180 track probes during a tracking cycle in order to indentify the range and range rate for a particular target being tracked with a high degree of accuracy, and also, to provide a sufficient number of probes and replies in the form of target signals to exchange data from the target vehicle to the probing vehicle. The portion of a system for handling such data is described in the co-pending application Ser. No. 643,479 entitled "Multiple Data Receiver for a Collision Avoidance System" identified above. The typical track format described but to be understood as not being so limited comprises a first period A during which 57 probes are transmitted, a second probe period B during which 66 probes are transmitted, and a third period C during which 57 probes are transmitted. Typically, the total elapsed time for such a period is about 293.5 milliseconds for three probe groups. If the range R is expressed in 50 foot increments then:

$$R = \frac{\overset{ABC}{\Sigma_c}}{N_{ABC}} \tag{2}$$

where $$\overset{ABC}{\Sigma_c}$$

equals the sum of 50 foot intervals over periods A, B, C, and $N_{ABC}$ equals the number of measurements made during periods A, B, and C.

Further the range rate can be represented by:

$$\dot{R} = \left(\frac{\overset{A}{\Sigma_c}}{N_A} - \frac{\overset{C}{\Sigma_c}}{N_C}\right)\frac{1}{T} \tag{3}$$

where $$\overset{A}{\Sigma_c}$$

equals the sum of 50 foot intervals over period A, $\Sigma_c$ equals the sum of 50 foot intervals over period C, $N_A$ equals the number of measurements during A, and $N_C$ equals the number of measurements during period C, and T equals the period of measurement. Substituting equations (2) and (3) into equation (1) with $N_A$ equal $N_C$ results in:

$$\frac{\overset{ABC}{\Sigma_c}}{N_{ABC}} = R_o + \left(\frac{\overset{A}{\Sigma_c} - \overset{C}{\Sigma_c}}{N_A}\right)\frac{\tau}{T} \quad (4)$$

where T is the time from the mid point of the A interval to the mid point of the C interval of the tracking format. The alarm time, tau ($\tau$), is then included in the following relation:

$$(\overset{A}{\Sigma_c} - \overset{C}{\Sigma_c})\frac{\tau}{N_A T} - \frac{\overset{ABC}{\Sigma_c}}{N_{ABC}} + R_0 \geqq 0 \quad (5)$$

which by rearranging can be represented by:

$$(\Sigma_c - \Sigma_c) - \frac{\overset{ABC}{\Sigma_c} N_A T}{N_{ABC}\tau} + \frac{R_0 N_A T}{\tau} \quad (6)$$

Constants K1 and K2 are defined as follows:

$$K_1 = \frac{N_{ABC}}{N_A T}\tau \text{ and } K_2 = \frac{N_A T}{\tau} \quad (7)$$

Then:

$$(\overset{A}{\Sigma_c} - \overset{C}{\Sigma_c}) - \frac{\overset{ABC}{\Sigma_c}}{K_1} + R_0 K_2 = 0 \quad (8)$$

where $R_0$ expressed in 50 foot intervals is 30. Equation (8) is implemented by the tau computer illustrated in FIG. 1B.

An 11-bit (modulo 1560) range counter 102, cleared at the beginning of each probe period by the probe signal $T_0$, starts at a count of zero and counts at the clock rate 9.7 MHz applied via clock bus 31 when each probe is transmitted. Whenever a video reply (18) appears at the leading edge detector 78 manifested by the leading edge signal 58 or at the trailing edge detector 81 manifested by the trailing edge signal 81a, the value in the range counter 102 is gated into a holding register 104 by the action of an OR gate 106 which enables an AND gate network 108, which comprises a plurality of parallel AND gates. Either of the respective signals 58 and 81a via detector buses 96 or 98 activate the OR gate 106 enabling the AND gate network 108 each AND gate of which is primed by a different one of the bits in the range counter 102 for transferring the count. Since each count in counter 102 represents 50 feet of range, the value transferred to the holding register 104 constitutes a range measurement for the corresponding target during the particular probe period in progress. A RAM 100 has a capacity to store sixteen twenty-bit words, stores a word corresponding to each of sixteen targets, and is addressed by the target counter 50 (FIG. 1A) via path 53. Target counter 50 addresses RAM 100 with a number corresponding to the target bit concurrently passing through control register 30 or auxiliary control register 32. The target addresses correlate the words in the RAM 100 to the target associated therewith. Each one of the sixteen possible targets is identified by the same target number during the 180 probes. Each time a new range measurement is entered into holding register 104 the RAM word 101 for that target is accessed via output buses 110 and 112 and applied to the arithmetic units 114 and 116. Arithmetic unit 114 is a suitable thirteen bit adder/subtractor while unit 116 is a twenty-bit subtractor.

Add/stub unit 114 is coupled to a cycle programmer 115 which provides an ADD signal in response to probe signals $T_0$ for the first 57 probes (A track period), a feed-through signal for the next 66 probes (B track period), and a subtract signal for the last 57 probes (C track period). Cycle programmer 115 provides a track period signal on path 123 and an evaluate signal on path 124 at the end of the track cycle, for example, after probe 180.

The add/sub unit 114 is placed in the feed through mode during the period of evaulate signal 124, which, in the described embodiment, is 2 milliseconds. Probes ($T_0$) are not transmitted during this time. This allows time to process and to evaluate the data and tau calculations for sixteen targets in two milliseconds. Evaluating each target requires 114 microseconds and the target counter 50 is advanced at the end of each 114 microseconds interval.

The RAM word diagram 101 is a pictorial representation showing the integer and faction of the tau word. The binary point is implied. When the range measurement is divided by $K_1$, the quotient results in a fraction which must be retained to maintain the desired accuracy. The integer part of the RAM word is applied as the "A" operand to the add/sub unit 114. The range holding register 104 contents are applied as the B operand to the unit 114. The result signal from the add/sub unit 114, concatenated with the fraction part of the RAM word is applied as the A operand of the subtractor 116, whose subtrahend signal (the B operand of 116) during track is the ten bit output signal from the divide-by-$K_1$ ROM 118. The ROM output signal is the result of dividing the contents of the range holding register 104 by a constant value $K_1$ as defined above.

The RAM word 101 has a zero value at the beginning of the track period. During the A track period, the range measurement in the holding register 104 is added to the integer part of the ROM word by adder/sub 114. The sum is applied to subtractor 116 where the range measurement is subtracted therefrom. The resulting difference is stored in RAM 100 via bus 120 at the corresponding target address until the next probe $T_0$. The process is repeated for each target that is identified and tracked during each probe. During the B track period, the add/sub unit 114 is put in a feed-through mode by cycle programmer 115 and the RAM word 101 portion bits $2^0 - 2^{12}$ via bus 110 are applied to subtractor 116 directly.

During the C track interval, the add/sub unit 114 subtracts each new range measurement from the previous range measurement value of the RAM word. The range measurement divided by the constant $K_1$ is subtracted for each probe throughout the track period via bus 112.

The dimension of the division by constant $K_1$ is carried to 7 binary places which by analysis has shown will provide an error in the tau warning of less than two percent, i.e., 25 + 0.5 seconds. The above described process is repeated for each target as its target bit is traversing the control register 30 or 32. For each target, an individual range measurement is made based on the time of arrival of the leading edge of the video reply from that target. A separate RAM word 101 is assigned to each target to maintain a record of the partial tau calculations performed each probe time.

At the completion of the track period of about 292 milliseconds, there is an evaluation period of about two milliseconds, identified by the "evaluate" signal from programmer 115 on path 124. This operates switch 119 from the tracking period condition during which bus 125 is coupled to subtractor 116, to the evaluate condition during which the contents of ROM 126 is coupled to subtractor 116. In ROM 126 is stored the value for $R_0 K_2$. At this time, each RAM word 101 in RAM 100 is compared to the constant $R_0 K_2$ using the subtractor 116 with the add/sub unit 114 in the feed through (idle) mode. The sign bit (S) of subtractor 116 is the indication of a tau warning, that is, a tau of less than or equal to 25 seconds has been determined for a particular target. When such occurs, an output signal is generated over output path 122 to be utilized as desired, as for example, an alarm in the form of a light flashing or a read-out to the pilot.

SUMMARY OF OPERATION

The operation of the tracker starts following the identification of remote stations (targets) by the correlator. The correlator requires about 10 to 25 interrogation signals or probes $T_0$ to identify targets. At the end of such a correlation period, the correlator hands-over such targets to the tracker. The operation to hand-over all of the targets that have been identified during this time of hand-over takes about one millisecond. Assuming that none of the targets are of the co-range type, each target bit will be passed through OR gate 70, AND gate 66, enabled by RAM 54 via inverter 67. Each of the target bits will be clocked through the shift register 30 and will be outputted from the shift register 30 depending on the operation of latch 79. Following the hand-over signal, each succeeding probe signal $T_0$ will elicit further responses from each of the identified targets. Such replies will be received and passed through receiver 22 to be applied to the leading edge detector 78 which is enabled by tracking gate 72. Early gate 74 and data gate 76 will act to enable the stage of latch 79 depending on the position of the target bit in shift register 30. The latch enabled will, thus, pass the leading edge of the reply signal, represented by signal 58 through the logic gates and OR gates 92 and 94 to be cycled through shift register 46. Shift register 46 will pass each of the target bits back into the loop via OR gate 70. Each of the target bits as they are sequenced through shift register 30 provide via the last stage at tap 18 a target counter signal, G2, to advance the target counter 50 and simultaneously reset latch 79 to be set by subsequent reply signals. It will be noted that the equivalent range of the 18 stage shift register 30 is about 900 feet. This is a design criterion of the system which allows for range differences between remote stations to be assumed to be greater than 900 feet. Any remote station that is relative to another remote station less than 900 feet will be treated as a co-range target and processed through the second register 32. Repeated subsequent probes refine the tracking of each of the remote targets by advancing or retarding the target bits through shift register 30 such as to establish coincidence between the tracking of the target bit with the corresponding reply signals 18. According to the system parameters of a preferred embodiment, 180 probes are used to define a target in this manner requiring about 293 milliseconds for the tracking cycle.

The accuracy of the determination of range rate or velocity depends (1) the accuracy of the range determination during the A interval and the accuracy of the range found during the C interval and (2) the time between the A and C intervals. By taking the average of 57 samples during each interval quite accurate range measurements are obtained. Ideally the time during the B interval are as long as possible but there is a conflicting requirement to keep the round time as short as possible, because the pilot's display is updated typically once a round time. Two hundred eighty-five probe periods or 293 microseconds is a good compromise. The choice of 57 for the number of measurements during each interval is dictated by the data message. With a different data message format, this number would change.

It should be noted that the total number of probes does not equal the measurement period. In the probe program (see Table I, supra) there are three intervals $B_1$, $B_3$, $B_4$ of 57 periods during which only three probes ($T_0$) per period are transmitted. Intervals $B_1$, $B_3$, and $B_4$ are dead times provided to increase the time between the A and C measurements. The occasional probe during these intervals is to keep the track gate 72 servoed on the target video 18. Concurrent with the tracking of each target, the computer (FIG. 1B) determines the tau of each target. The tau computer provides a range count following each probe ($T_0$) and transfers that range to the holding register 104 upon the receipt of each reply signal that has its leading edge detected. The computational logic comprising adder/subtractor 114 and subtractor 116 is programmed by programmer 115 to be in an add mode for 57 probes, an idle mode for 66 probes, and a subtract mode for 57 probes. During each probe, each target is appraised for its tau by transferring the range of that target in each probe to the computational logic. The computer provides the calculation to determine whether tau is critical. If a critical tau is determined, an output warning is generated via output path 122. This is determined by the computer at the end of the tracking period of 180 probes. The cycle programmer 115 operates switch 119 via the evaluate signal over path 124 to apply the ROM 126 value to the substractor to make the comparison for each target in sequence. Any comparison manifesting a critical tau will generate the output warning.

At the end of the evaluate period, which takes about two milliseconds for all of the 16 possible targets, the tracker and computer are placed in a waiting mode for subsequent hand-overs from correlator 10 to repeat the cycle.

For co-range targets, that is, two targets having relative range differentials of less than 900 feet will be identified by timing control 12 to provide an appropriate signal to RAM 54 to steer each bit through the steering circuit comprising AND gates 66 and 68 for passing the respective target bits into shift register 30 or 32. Thus, the first target of such a co-range pair will be passed through AND gate 66 through shift register 30, the received target reply signal 18 having its leading edge detected for setting the latch 79. The second target bit of the co-range pair will be passed into shift register 32 and its reply signal 18 will have its trailing edge detected for setting the latch 83. The output taps of shift register 32 are arranged to respond to target bits passing therethrough relative to its respective trailing edge. Thus, two co-range target reply signals may be distinguished provided the target range difference is at least 600 feet. The passage of each such co-range target bit will be passed through shift register 32 and tapped at stage 18 to advance the target counter 50 via signal G3. The computation of tau will be performed in the same manner noting that the continually incremented present range is transferred to the hold register 104 in response to any reply signal. The operating time of each computation is sufficiently rapid as to be able to distinguish a co-range target mode even though the targets are as close as 600 feet. As the target count is advanced at stage 18, a read and write signal is passed to the data decoder and receiver via leads 201 and 202 as described in the aforesaid copending application for the "Multi-Target Data Receiver for a Collision Avoidance System," Ser. No. 643,479.

What is claimed is:

1. In combination, means for tracking reply signals from remote vehicles responding to interrogating signals;

means for distinguishing reply signals of one remote vehicle from the reply signals of another remote vehicle having a range that is nearly the same range as said one vehicle by generating first and second timing signals indicative of the receipt of a first reply signal closely followed by a second reply signal;

means responsive to said first and second timing signals for detecting respectively the leading edge and trailing edge of the respective reply signals and generating first and second tracking signals corresponding thereto; sequential storage means having a plurality of stages for storing each of said first and second tracking signals in a stage having a location corresponding to the range of each of said remote stations, each stage corresponding to a predetermined increment in range;

clock means for clocking said storage means to sequentially transfer said tracking signals from stage to stage so that each signal is in a stage corresponding to the relative difference in range of each of said replying remote vehicles;

means responsive to said reply signals for servoing said tracking signals to advance or retard the position of said tracking signals in said storage means following each reply signal such that the tracking signal is in substantial coincidence with the respective one of each of said reply signals, whereby the relative range of each of said plurality of replying remote vehicles is determined by tracking said reply signals.

2. In a radar tracking system of the transponder type wherein reply signals from one or more remote stations are respectively responsive to interrogation signals having a predetermined repetition rate during a selected period, said period being defined by a predetermined number of said interrogation signals, said system including correlator means including means for generating said interrogation signals, and for correlating replies thereto to identify remote stations and to provide, only during a preselected period prior to said selected period, a hand-over signal representing each of such remote stations, a tracker for tracking said reply signals comprising:

remote station counter means responsive to said hand-over signals to count the number of remote vehicles identified by said hand-over signals and for providing a discrete address signal designating respectively each correlated remote station, said address signal represented by said count indicating the order of receipt of said hand-over signals following each interrogation signal during said pre-selected period;

random access memory (RAM) means, having an address input and a control signal input, for storing data representing said hand-over signal and the count of each respective remote station manifested by each of said hand-over signals;

track mode means responsive to said hand-over signals for generating a first digital bit signal that represents a remote station having a range that is relatively widely separated from the range of the remote station represented by the immediately preceding hand-over signal and generating a second digital bit signal that represents a remote station having a range nearly the same as the range of the first digital bit signal;

said RAM means including means for generating a first steering control signal responsive to said address and first digital bit signal indicative of reply signals from remote stations that are respectively in sequence relatively widely separated in range and a second steering control signal responsive to said second digital bit signal indicative of reply signals of remote stations that are nearly of the same range as a remote station represented by the preceding digital bit signal;

sequential storage means having a plurality of stages for storing each of said first and second digital bit signals in a stage having a location corresponding to the relative range of each of said remote stations, each stage corresponding to a predetermined increment in range;

clock means for clocking said storage means during said selected period to thereby sequentially transfer said bit signals from stage to stage so that each bit signal is in a stage corresponding to the relative difference in range of each of said replying remote stations;

means responsive to said first and second steering control signals for selectively steering said bit signals into said storage means in the respective sequential order as received in accordance with the relative difference in range between each of the reply remote stations; and track gate means for controlling a detector responsive to said reply signals received during said selected period for generating a count signal to advance said counter means for each reply signal that is nearly coincident with a digital bit signal in said sequential storage means, and to advance or retard the position following each reply signal of each of said bit signals in said storage means such that said respective bit signals are servoed to be in substantial coincidence with the respective one of each of said reply signals, whereby the relative range of each of a plurality of replying remote stations is determined by tracking said reply signals.

3. A tracker according to claim 2 wherein said sequential storage means includes:
a first and a second shift register each shift register having a plurality of predetermined stages and an input and a plurality of output stages and further includes a third shift register having its input stage coupled to said output stages of said first and second shift registers, the output of said third shift being coupled by a coincidence gate to the respective inputs of said first and second shift registers, each stage adapted to store one of said binary bit signals and to transfer sequentially in response to said clock signals a bit stored in any of said stages, said steering means including means to steer said first and second digital bit signals respectively into the input stage of the first and second shift registers by enabling the coincidence gate associated with said shift register input stage.

4. A tracker according to claim 3 wherein said track gate means includes a first and second set of gates coupled to said first and second shift registers to enable a respective first and second detector to detect the leading edge and trailing edge of reply signals associated with the respective first and second digital bits, whereby reply signals representing remote stations having nearly the same range are tracked in said first and second shift registers and separated sufficiently in corresponding relative stage positions to be identified and tracked as different remote stations.

5. A tracker according to claim 2 further including means for determining tau for each of said remote stations, said tau determining means including:
range counter means responsive to each of said interrogation signals and said clock means for providing a range signal that increments with each clock signal indicative thereby of an instantaneous count representative of range;
storage register means responsive to each of said count signals to receive and store the contents of said range counter means;
means for incrementing for a first number of interrogation signals and decrementing for a second number of interrogation signals the contents of said storage register,
subtracting means for subtracting the contents of said incrementing/decrementing means for a constant (1/K1) determinative of a selected value of tau,
a second random access memory (RAM) means addressed by said remote station counter means for storing output data of the output of said subtractor associated with the count signals of each of said remote stations,
the data in said second RAM comprising a first group of bits representing the adjusted contents of said storage register and a second group of bits representing said constant, said first group of bits being applied to said incrementing/decrementing means and said second group of bits being applied to said subtractor in response to each address to alter the contents of said subtracting means as the range of each respective remote station may change,
and means for comparing the contents of said subtracting means to a second constant to determine tau when said contents exceeds a predetermined value, and to provide an alarm if an exceedance occurs.

* * * * *